(12) United States Patent
Yamada

(10) Patent No.: US 11,912,461 B2
(45) Date of Patent: Feb. 27, 2024

(54) SHOCK ABSORBING MEMBER, PACKAGING MATERIAL, AND PACKAGE

(71) Applicant: FUJIFILM Business Innovation Corp., Tokyo (JP)

(72) Inventor: Keigo Yamada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/721,356

(22) Filed: Apr. 15, 2022

(65) Prior Publication Data

US 2023/0129657 A1    Apr. 27, 2023

(30) Foreign Application Priority Data

Oct. 22, 2021   (JP) ................. 2021-172919

(51) Int. Cl.
*B65D 19/38* (2006.01)
*F16F 7/00* (2006.01)
*B65D 19/00* (2006.01)

(52) U.S. Cl.
CPC ......... *B65D 19/38* (2013.01); *B65D 19/0048* (2013.01); *F16F 7/00* (2013.01); *B65D 2519/00019* (2013.01); *B65D 2519/00273* (2013.01); *B65D 2519/00288* (2013.01); *B65D 2519/00323* (2013.01); *B65D 2519/00333* (2013.01)

(58) Field of Classification Search
CPC ........ B65D 10/38; B65D 10/0048; F16F 7/00
USPC .............................. 108/57.12, 55.3; 248/638
See application file for complete search history.

(56) References Cited

U.S. PATENT DOCUMENTS

| | | | | |
|---|---|---|---|---|
| 3,436,045 A * | 4/1969 | Anspaugh | ................ | F16M 7/00 411/397 |
| 4,015,710 A * | 4/1977 | Biggs | ..................... | B65D 19/44 248/346.02 |
| 4,717,025 A * | 1/1988 | Maurer | .................. | B65D 19/20 108/55.3 |
| 5,180,134 A * | 1/1993 | Mallak | ..................... | B65G 7/02 248/346.03 |
| 5,195,439 A * | 3/1993 | Harder | ............... | B65D 19/0026 108/901 |
| 5,676,063 A * | 10/1997 | Wallace | ................. | B65D 19/44 108/55.3 |
| 5,842,424 A * | 12/1998 | Prevot | .................... | B65D 19/44 108/55.3 |
| 5,911,179 A * | 6/1999 | Spiczka | ............ | B65D 19/0095 108/51.11 |
| 5,970,885 A * | 10/1999 | Polando | ................. | B65D 19/44 108/55.3 |
| 5,970,886 A * | 10/1999 | Knio | ..................... | B65D 19/38 108/57.12 |

(Continued)

FOREIGN PATENT DOCUMENTS

| | | | | |
|---|---|---|---|---|
| EP | 1547931 A2 * | 6/2005 | ........... | B65D 19/385 |
| JP | 2008230659 | 10/2008 | | |
| JP | 2009149328 | 7/2009 | | |

*Primary Examiner* — Jose V Chen
(74) *Attorney, Agent, or Firm* — JCIPRNET

(57) ABSTRACT

A shock absorbing member which absorbs a shock acting between a top plate with an upper surface on which a fixation target is loaded and the fixation target includes a fixation part that fixes the fixation target and a shock absorbing part that is supported by the top plate, supports the fixation part, and absorbs a shock acting on the fixation part.

18 Claims, 3 Drawing Sheets

(56) References Cited

U.S. PATENT DOCUMENTS

| | | | | |
|---|---|---|---|---|
| 6,155,527 A * | 12/2000 | Muyskens | ......... | B65D 19/0002 |
| | | | | 248/346.03 |
| 7,555,879 B1 * | 7/2009 | Utz | ............ | B65D 19/44 |
| | | | | 53/410 |
| 7,793,828 B2 * | 9/2010 | Booth | .......... | G07F 19/20 |
| | | | | 108/55.3 |
| 8,251,467 B2 * | 8/2012 | Peng | ............ | H05K 7/1488 |
| | | | | 312/351.1 |
| 8,480,052 B2 * | 7/2013 | Taylor | ........... | G06F 1/187 |
| | | | | 267/152 |
| 8,511,637 B2 * | 8/2013 | Mitsch | .......... | F01D 25/28 |
| | | | | 248/677 |
| 8,640,632 B1 * | 2/2014 | Odle | ............ | F24F 1/60 |
| | | | | 108/57.2 |
| 10,059,361 B2 * | 8/2018 | Weisbrod | ...... | B65D 19/0002 |
| 10,414,543 B2 * | 9/2019 | Chezem | ........ | B65D 19/40 |
| 10,557,589 B1 * | 2/2020 | Carpenter | ...... | F16M 11/22 |
| 11,053,058 B2 * | 7/2021 | Alfoqaha | ........ | B65D 81/127 |
| 11,460,148 B1 * | 10/2022 | Carpenter | ...... | F16M 11/22 |
| 2007/0283858 A1 * | 12/2007 | Ballard | .......... | B65D 19/0016 |
| | | | | 108/57.12 |
| 2013/0181107 A1 * | 7/2013 | Stansbury | ...... | F16M 11/22 |
| | | | | 248/677 |
| 2014/0090581 A1 * | 4/2014 | Schultz | .......... | B65D 19/0095 |
| | | | | 248/634 |
| 2016/0061285 A1 * | 3/2016 | Green | ........... | B65D 19/0028 |
| | | | | 267/141 |
| 2016/0107793 A1 * | 4/2016 | Jiang | ............ | B65D 19/42 |
| | | | | 206/386 |
| 2016/0221716 A1 * | 8/2016 | Embleton | ....... | H05K 7/20163 |
| 2018/0134445 A1 * | 5/2018 | Chezem | ......... | B65D 81/054 |
| 2018/0208358 A1 * | 7/2018 | Ziemer | .......... | B65D 19/0095 |
| 2020/0056676 A1 * | 2/2020 | Martin Hernández | | |
| | | | | F16F 15/022 |
| 2021/0221559 A1 * | 7/2021 | Wakimoto | ....... | B65D 81/056 |

\* cited by examiner

SHOCK ABSORBING MEMBER, PACKAGING MATERIAL, AND PACKAGE

CROSS-REFERENCE TO RELATED APPLICATIONS

This application is based on and claims priority under 35 USC 119 from Japanese Patent Application No. 2021-172919 filed Oct. 22, 2021.

BACKGROUND

(i) Technical Field

The present invention relates to a shock absorbing member, a packaging material, and a package.

(ii) Related Art

Regarding a plate-shaped packaging member (so-called pallet) with an upper surface on which goods are placed in the case of transportation or storage of the goods in physical distribution, techniques described in JP2009-149328A and JP2008-230659A are known.

Described in JP2009-149328A is a configuration in which a shipping box (2) is fixed to an upper surface of a cardboard pallet (1) by means of a lock member (not shown) and a product is accommodated in the shipping box (2). In the case of the technique described in JP2009-149328A, a shock absorbing member (3) is provided on a side surface of the cardboard pallet (1) so that a shock to the cardboard pallet (1) from a lateral side is absorbed.

Described in JP2008-230659A is a technique in which a bottom surface of a device body (D0) is supported by means of first shock absorbing members (11) disposed at four corners of a first base (12) and movement casters (Y) are held in a state of floating in the air in a case where the device body (D0), which is heavy, is to be loaded on a wooden pallet (17).

SUMMARY

Aspects of non-limiting embodiments of the present disclosure relate to a shock absorbing member, a packaging material, and a package that disperse, in comparison with a case where a fixation target is fixed without a shock absorbing part being provided between a top plate and a fixation member, a force by which the fixation target is pressed against the top plate in the case of application of an external force.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a shock absorbing member which absorbs a shock acting between a top plate with an upper surface on which a fixation target is loaded and the fixation target, the shock absorbing member including a fixation part that fixes the fixation target and a shock absorbing part that is supported by the top plate, supports the fixation part, and absorbs a shock acting on the fixation part.

BRIEF DESCRIPTION OF THE DRAWINGS

Exemplary embodiment(s) of the present invention will be described in detail based on the following figures, wherein.

DETAILED DESCRIPTION

Next, a specific example (hereinafter, referred to as example) of an exemplary embodiment of the present invention will be described with reference to the drawings. However, the present invention is not limited to an example as follows.

In the following description which will be made by using the drawings, members other than members necessary for the description are not shown as appropriate for the sake of easy understanding.

Example 1

Figure 1:
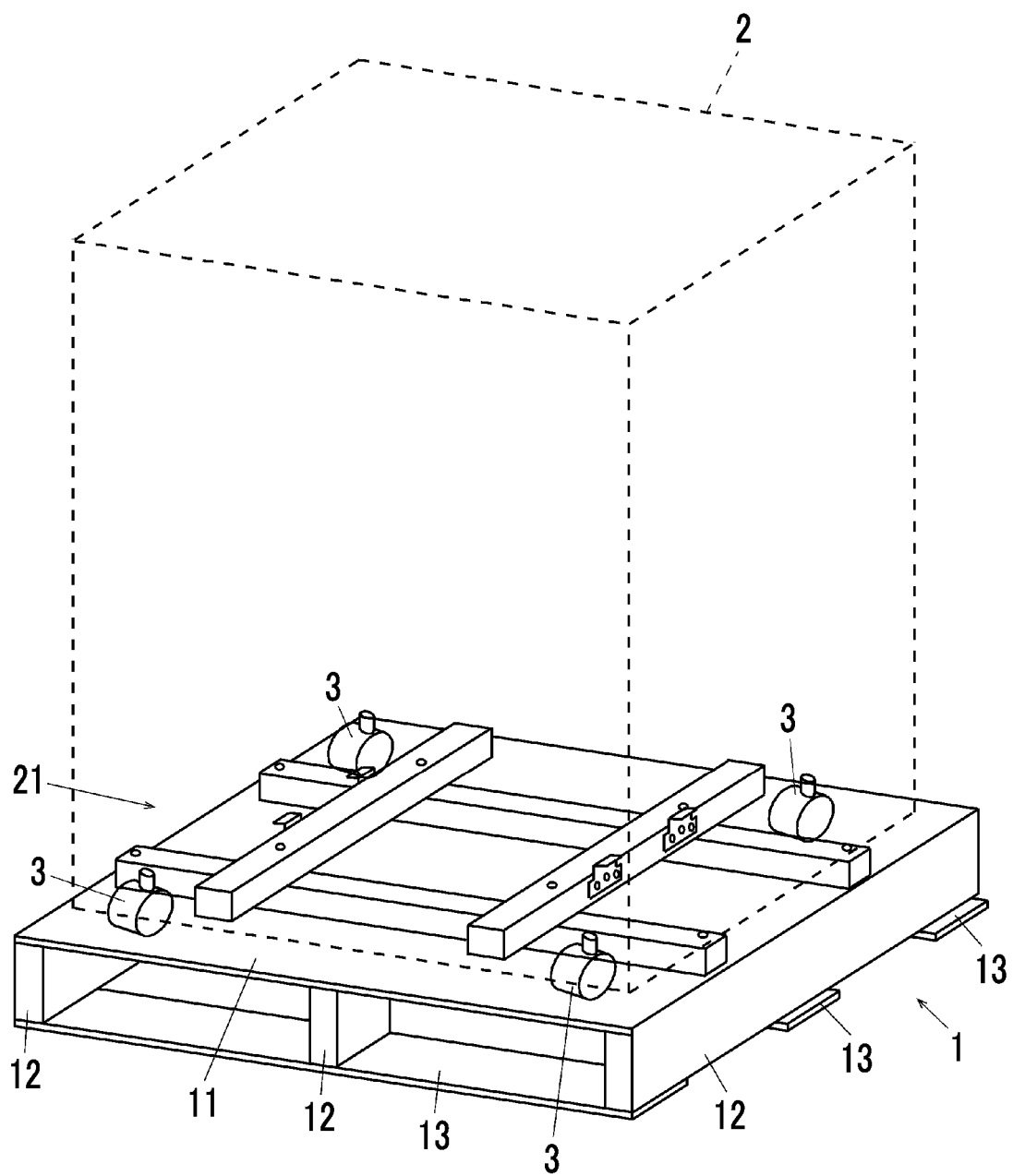
FIG. 1 is a schematic view of a packaging member and a fixation target according to Example 1.

FIG. 1 is a schematic view of a packaging member and a fixation target according to Example 1.

Figure 2:
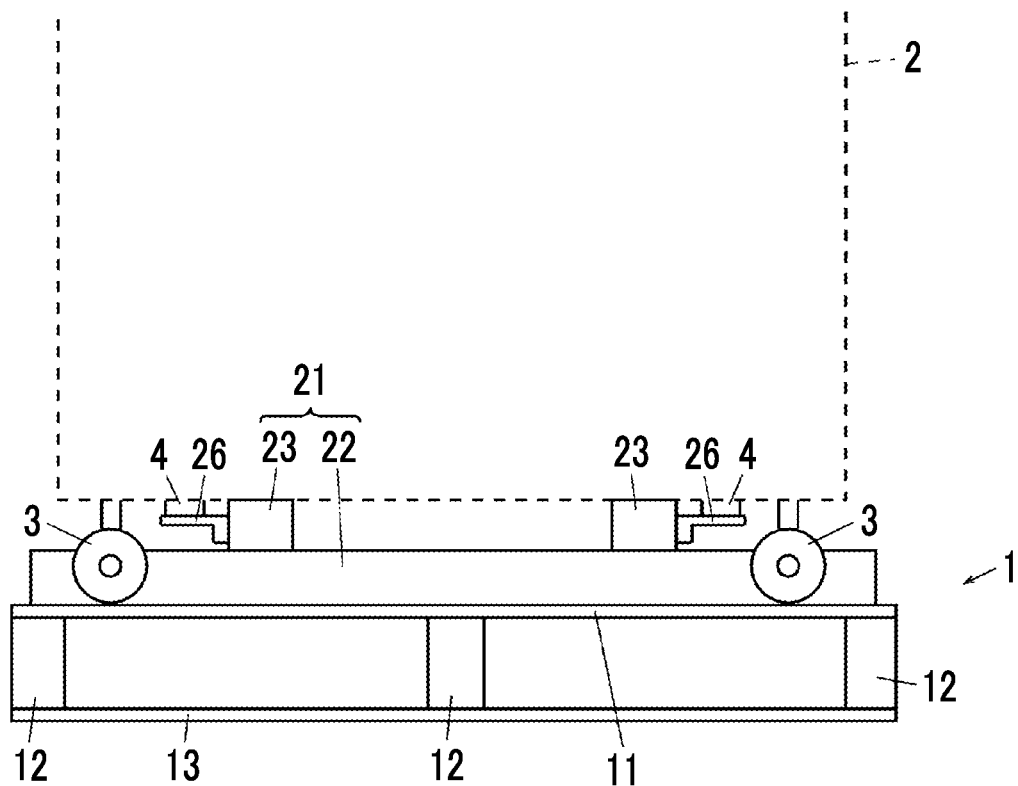
FIG. 2 is a front view of the packaging member and the fixation target according to Example 1.

FIG. 2 is a front view of the packaging member and the fixation target according to Example 1.

In FIGS. 1 and 2, a copying machine 2, which is an example of the fixation target, is loaded on a pallet 1, which is an example of the packaging member in Example 1 of an exemplary embodiment of the present invention. Casters 3, which are examples of contact portions, are supported on a bottom portion of the copying machine 2 of Example 1. The casters 3 can be used in a case where the copying machine 2 is to be moved on an upper surface of the pallet 1 or a floor surface of an office or the like. In addition, anchors 4, which are examples of fixation target portions, are fixed and supported under the bottom portion of the copying machine 2. The anchors 4 of Example 1 are members used to fix the copying machine 2 via a fixation tool for earthquake proofing in a case where the copying machine 2 is to be installed in an office or the like.

Figure 3:
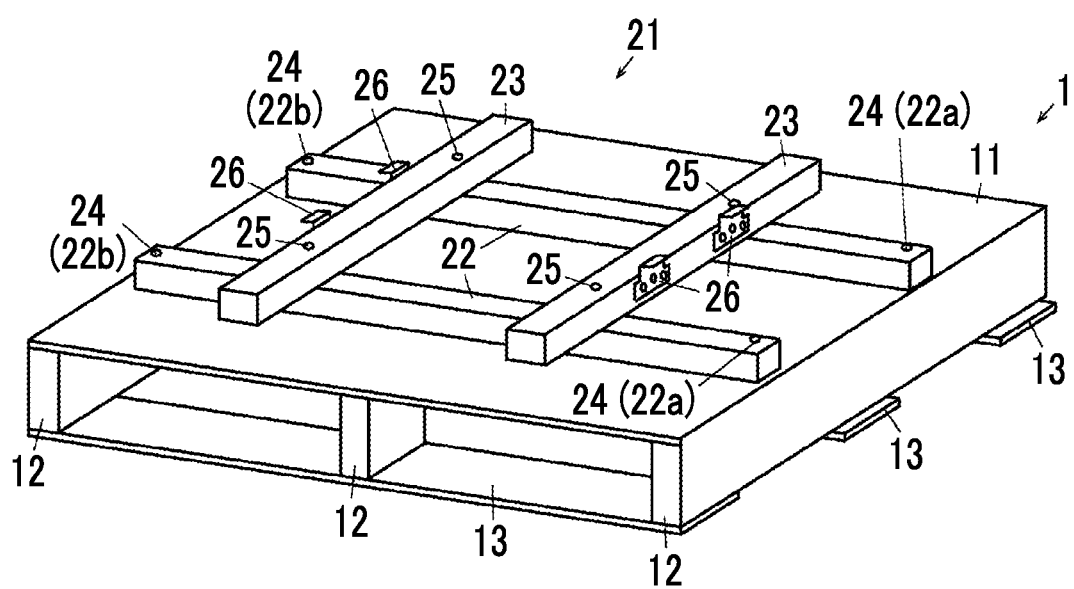
FIG. 3 is a perspective view of the packaging member of Example 1.

FIG. 3 is a perspective view of the packaging member of Example 1.

In FIGS. 1 to 3, the pallet 1 includes a plate-shaped top plate 11. Beams 12, which are examples of connection parts, are supported on a lower surface of the top plate 11. Each of the beams 12 of Example 1 is formed in a rod-like shape extending in a front-rear direction, which is an example of a longitudinal direction. In addition, a plurality of the beams 12 are disposed at intervals along a right-left direction intersecting the longitudinal direction. Therefore, the pallet 1 can be lifted and lowered with a fork (claw) of a forklift inserted between the beams 12. In Example 1, three beams 12 provided at right and left ends and the central portion of the top plate 11 are used. However, the number of the beams 12 is not limited to three. The number of the beams 12, the size of each beam 12, and the shape of each beam 12 can be changed in any manner in accordance with the size, the specification, or the like of the top plate 11. In addition, although a configuration in which the shape of each beam 12 is a rod-like shape has been described as an example, the shape is not limited thereto. A configuration in which the shape of each beam 12 is a massive rectangular parallelepiped shape or a massive cube shape (that is, so-called block shape) instead of the rod-like shape may also be adopted.

Flat plate-shaped bottom plates 13 extending in the right-left direction are supported on lower surfaces of the beams 12. A plurality of the bottom plates 13 are disposed at intervals in the front-rear direction. Note that in Example 1, the pallet 1 including the bottom plates 13 has been described as an example. However, a configuration in which the pallet 1 includes no bottom plate 13 may also be adopted.

A shock absorbing material 21, which is an example of a shock absorbing part, is supported on an upper surface of the top plate 11. The shock absorbing material 21 of Example 1 includes lower rod materials 22, which are examples of first shock absorbing parts, and upper rod materials 23, which are examples of second shock absorbing parts. The lower rod materials 22 of Example 1 are supported on the upper surface of the top plate 11. Each of the lower rod materials 22 is formed in a rod-like shape extending along the right-left direction, which is an example of a first longitudinal direction. The lower rod materials 22 are supported on the top plate 11 by means of bolts 24, which are examples of fastening parts, at first fixation positions 22*a* and second fixation positions 22*b* that are separated from each other in the right-left direction. Each of the lower rod materials 22 of Example 1 is fixed at two positions (first fixation position 22*a* and second fixation position 22*b*) instead of being fixed over the entire upper surface of the top plate 11 in the longitudinal direction and is not fixed to the top plate 11 at an area between the first fixation position 22*a* and the second fixation position 22*b*. Note that, in Example 1, an area in which the lower rod materials 22 are not fixed to the top plate 11 is longer than an area in which the lower rod materials 22 are fixed to the top plate 11, for example. In addition, in Example 1, two lower rod materials 22 are disposed at an interval in the front-rear direction.

Each of the upper rod materials 23 in Example 1 is formed in a rod-like shape extending along the front-rear direction, which is an example of a second longitudinal direction. The upper rod materials 23 are disposed across the two lower rod materials 22. Each of the upper rod materials 23 is supported on the lower rod material 22 by means of bolts 25, which are examples of fastening parts, at two positions at end portions in the front-rear direction, that is, two positions separated from each other in the longitudinal direction. In Example 1, two upper rod materials 23 are disposed at an interval in the right-left direction. Note that, as shown in FIG. 2, in Example 1, each of the upper rod materials 23 is disposed at a position between the beams 12.

In addition, regarding the upper rod materials 23 of Example 1, the heights of upper surfaces of the upper rod materials 23 are set such that a bottom surface of a frame body (frame) of the copying machine 2 can come into contact with the upper surfaces of the upper rod materials 23. Note that it is also possible to set the heights of the upper rod materials 23 such that the upper surfaces of the upper rod materials 23 are separated from the bottom surface of the copying machine 2.

Note that in Example 1, the lower rod materials 22 and the upper rod materials 23 are installed to be separated from the positions of the casters 3. That is, the shock absorbing material 21 is installed so as not to come into contact with the casters 3.

Brackets 26, which are examples of fixation parts, are supported on the upper rod materials 23. The brackets 26 of Example 1 are disposed at positions corresponding to the positions of the anchors 4. In Example 1, the brackets 26 are disposed at positions between the two lower rod materials 22. In addition, the brackets 26 are supported on side surfaces of the upper rod materials 23 (that is, side surfaces that are not upper surfaces at which upper rod materials 23 face copying machine 2) by means of screws (not shown), which are examples of fastening members. Furthermore, the brackets 26 and the anchors 4 can be attachably and detachably fixed by using the same fixation tool as the fixation tool for earthquake proofing. That is, in Example 1, gaps are formed between the brackets 26 and the anchors 4 and are fixed by means of a belt, a wire, or the like which is an example of the fixation tool so that the copying machine 2 is fixed in a state of being able to move relative to the brackets 26. Therefore, the brackets 26 and the copying machine 2 are fixed to each other with a so-called clearance or a margin provided between the brackets 26 and the copying machine 2. In a case where transportation is performed by using the pallet 1 in a state where the brackets 26 and the copying machine 2 are firmly fixed to each other, vibration and a shock on the pallet 1 is likely to be wholly transmitted to the copying machine 2 and the copying machine 2 is likely to break down. However, in a case where there is a clearance or a margin, a shock or the like is likely to be dispersed.

The shock absorbing material 21 and the brackets 26 constitute a shock absorbing member 21+26 in Example 1.

In addition, the pallet 1, the shock absorbing member 21+26, and the like constitute a packaging material 1+21+26 in Example 1.

Furthermore, the copying machine 2, the packaging material 1+21+26, and the like constitute a package 1+2+21+26 in Example 1.

Action of Example 1

Figure 4:
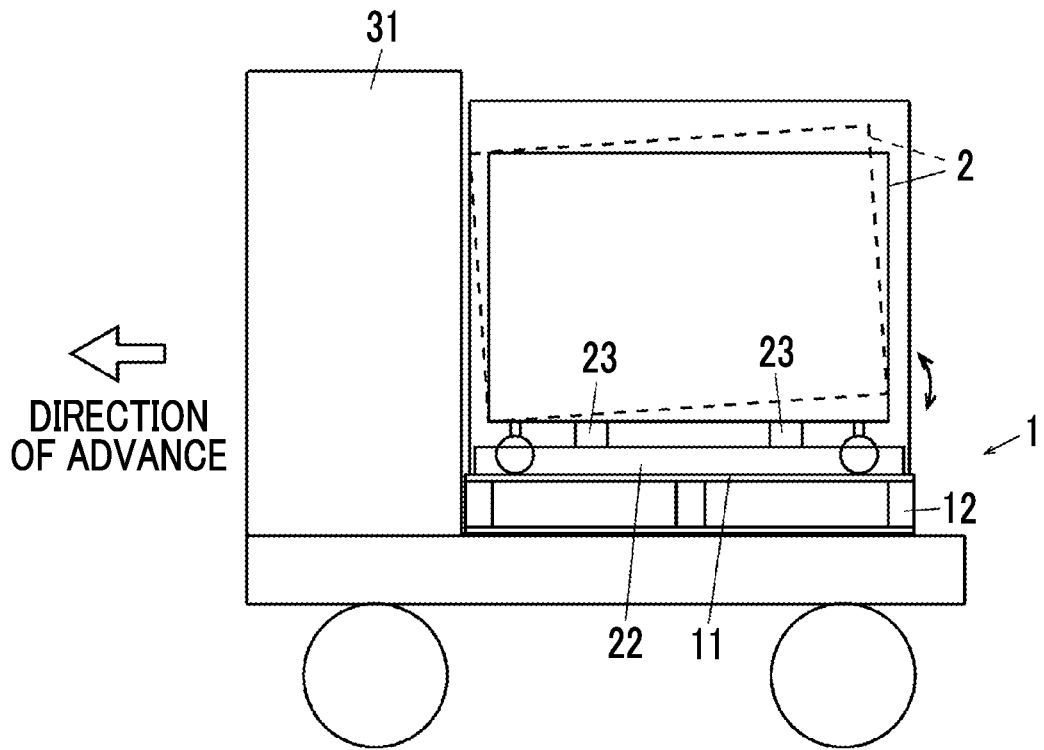
FIG. 4 is an explanatory view of the action of Example 1 related to a case where a shock is applied to a pallet and a copying machine in a horizontal direction.

FIG. 4 is an explanatory view of the action of Example 1 related to a case where a shock is applied to the pallet and the copying machine in a horizontal direction.

Regarding the pallet 1 of Example 1 that has the above-described configuration, the brackets 26 and the anchors 4 are fixed to each other in a state where the copying machine 2 is placed on the top plate 11 in a case where the copying machine 2 is transported and stored by means of the pallet 1.

During transportation or movement in a warehouse or the like of the copying machine 2 in a state of being fixed to the pallet 1, an external force may act on the pallet 1 and the copying machine 2 like a shock that is applied to the pallet 1 and the copying machine 2 in a perpendicular direction due to a fall of the pallet 1 and the copying machine 2 or a force that is applied to the pallet 1 and the copying machine 2 in a horizontal direction due to a sudden movement, sudden stoppage of movement, or the like. As an example in which a shock is applied to the pallet 1 and the copying machine 2 in the horizontal direction, a force (inertial force) in a horizontal direction acts on the pallet 1 and the copying machine 2 and a shock in the horizontal direction acts on the brackets 26 in a case where a transportation vehicle 31 advancing in a left direction in FIG. 4 is suddenly stopped as shown in FIG. 4. In addition, as shown by a broken line in FIG. 4, an upper side of the copying machine 2 tilts in the direction of advance with respect to a lower side and a rear side of the copying machine 2 falls downward due to the gravity after being raised once. Therefore, a shock in the perpendicular direction acts on the brackets 26.

In the case of the related art such as JP2009-149328A and JP2008-230659A, a product itself is directly fixed to an upper surface of a cardboard pallet or supported by a first shock absorbing member (corresponding to brackets 26 of Example 1) placed on an upper surface of a first base. Therefore, in a case where a shock in a perpendicular direction acts between the product and the first shock absorbing member, the shock is directly applied to a top surface of the cardboard pallet or the first shock absorbing member. Accordingly, there is a possibility of damage to the cardboard pallet and the first shock absorbing member such as a crack or a dent. In addition, in a case where a shock absorbing material is damaged, the shock absorbing material cannot be reused, which causes a burden on the environment. To suppress damage to the shock absorbing material, it is necessary to take countermeasures such as thickening a top plate of the cardboard pallet or using a high-stiffness material for the shock absorbing member. However, there is a problem that cost for thickening the top plate or the like is likely to increase or the weight of the entire pallet is likely to increase.

With regard to this, in Example 1, the brackets 26 are not directly supported by the top plate 11 but are supported via the shock absorbing material 21. In a case where a shock acts such that the copying machine 2 falls downward, the brackets 26 receive a downward pressing force. Here, the upper rod materials 23 are supported by the lower rod materials 22 and a gap is provided between the upper rod materials 23 and the upper surface of the top plate 11. Therefore, in a case where a force acts on the brackets 26, the central portions of the upper rod materials 23 can be bent downward. Accordingly, the shock absorbing material 21 can alleviate a shock (that is, absorb shock) with the upper rod materials 23 being bent and the lower rod material 22 being compressed. That is, it is possible to disperse, by means of the shock absorbing material 21, a force received by the brackets 26. Therefore, even in a case where a shock is generated, damage to the brackets 26 and damage to the top plate 11 can be suppressed in comparison with a case where a product is directly fixed to a top plate as in the related art described in JP2009-149328A and JP2008-230659A.

In addition, regarding the pallet 1 of Example 1, each of the upper rod materials 23 is formed in a rod-like shape extending in the longitudinal direction. Therefore, the brackets 26 can be supported on any positions on the upper rod materials 23. Accordingly, in a case where a different model or a different product is to be fixed by means of the brackets 26 and the anchors 4 are at different positions, it is possible to change attachment positions of the brackets 26.

Furthermore, regarding the pallet 1 of Example 1, the positions of the bolts 24 at which the lower rod material 22 is attached to the top plate 11 or positions at which the upper rod material 23 is attached to the lower rod material 22 are disposed at both end portions of each member in the longitudinal direction. Therefore, for example, even in a case where the lower rod materials 22 are to be attached and detached with respect to the top plate 11 with the copying machine 2 placed on the upper surface of the top plate 11 or a case where the upper rod materials 23 are to be attached and detached with respect to the lower rod materials 22, it may be possible to perform work while easily accessing the top plate 11 from outside in comparison with a case where fixation is made at a central portion in the longitudinal direction. Therefore, the efficiency of the work is improved.

For example, the above-described point is preferable for a case where the heights of the brackets 26 do not match and the lower rod materials 22 are to be replaced with lower rod materials having different heights.

In addition, regarding the pallet 1 of Example 1, the brackets 26 are supported on the side surfaces of the upper rod materials 23. Therefore, even in a case where gap members such as spacers or shock absorbing members such as cushions are interposed between the brackets 26 and the upper rod materials 23, the heights of the upper surfaces of the brackets 26 are not changed. Accordingly, position adjustment may be facilitated and a shock absorbing effect may be improved in comparison with a case where the brackets 26 are supported on the upper surfaces of the upper rod materials 23.

Furthermore, regarding the pallet 1 of Example 1, the lower rod materials 22 and the upper rod materials 23 do not come into contact with the casters 3. The casters 3 are relatively fragile components and in a case where the lower rod materials 22 or the upper rod materials 23 come into contact with the casters 3, a force may be applied to the casters 3 due to vibration in the case of transportation, bending in the case of shock absorption, distortion, or the like and thus the casters 3 may be damaged. Therefore, in the case of a configuration in Example 1 in which the lower rod materials 22 and the upper rod materials 23 do not come into contact with the casters 3, damage to the casters 3 may be suppressed. Particularly, in Example 1, the upper surfaces of the upper rod materials 23 come into contact with the bottom surface of the copying machine 2. Therefore, even in a case where a shock acts in a direction to be pressed against the top plate 11, not the entire weight of the copying machine 2 acts on the casters 3 only but a load can also be received by the upper surfaces of the upper rod materials 23. Therefore, the load can be dispersed and damage to the casters 3 is suppressed.

In addition, regarding the pallet 1 of Example 1, the lower rod materials 22 extend in directions intersecting the beams 12 and each of the lower rod materials 22 is disposed across the plurality of beams 12. In a case where the lower rod material 22 is disposed between the beams 12 and is disposed to be parallel to the beams 12 and a force that presses the lower rod materials 22 against the top plate 11 acts, the force acts on a portion of the top plate 11 that is at a position between the beams 12. Therefore, in a case where the strength of the top plate 11 is insufficient, the top plate 11 may be damaged. With regard to this, in Example 1, each of the lower rod materials 22 is disposed across the plurality of beams 12. Therefore, even in a case where a force acts on the lower rod materials 22 due to a shock caused by a fall, the load can be received by the beams 12. Therefore, the shock is dispersed and damage to the top plate 11 is suppressed.

In addition, regarding the pallet 1 of Example 1, the shock absorbing material 21 includes the lower rod materials 22 and the upper rod materials 23 and it is possible to easily cope with, by preparing the same types of upper rod materials 23 and the plurality of lower rod materials 22 that are different in height, a case where a product to be loaded onto the pallet 1 is changed and the height of a bottom surface is changed, for example. Vice versa, it is also possible to prepare the same types of lower rod materials 22 and the upper rod materials 23 respectively corresponding to products to be loaded.

Furthermore, regarding the pallet 1 of Example 1, the lower rod materials 22 and the upper rod materials 23 are disposed in a grid pattern or in parallel crosses so that a shock is absorbed by means of the upper rod materials 23 being bent. The brackets 26 can be supported on a shock absorbing material in a massive shape by using an elastic material such as rubber, a foam material, or the like so that a shock is absorbed by compression (elastic deformation) of the shock absorbing material. In this case, the shock absorbing effect may be insufficient in a case where only compression of an object is used and in a case where the distance between the bottom surface of a product and the top plate 11 is short, the length of the shock absorbing material itself is also short and thus the shock absorbing effect is likely to be insufficient. With regard to this, an improvement in shock absorbing effect can be expected since bending is used as in Example 1. In addition, in Example 1, the shock absorbing effect attributable to bending is easily obtained since the brackets 26 are disposed at the central portions of the upper rod materials 23 that are likely to be bent.

Modification Example of Example 1

Figure 5:
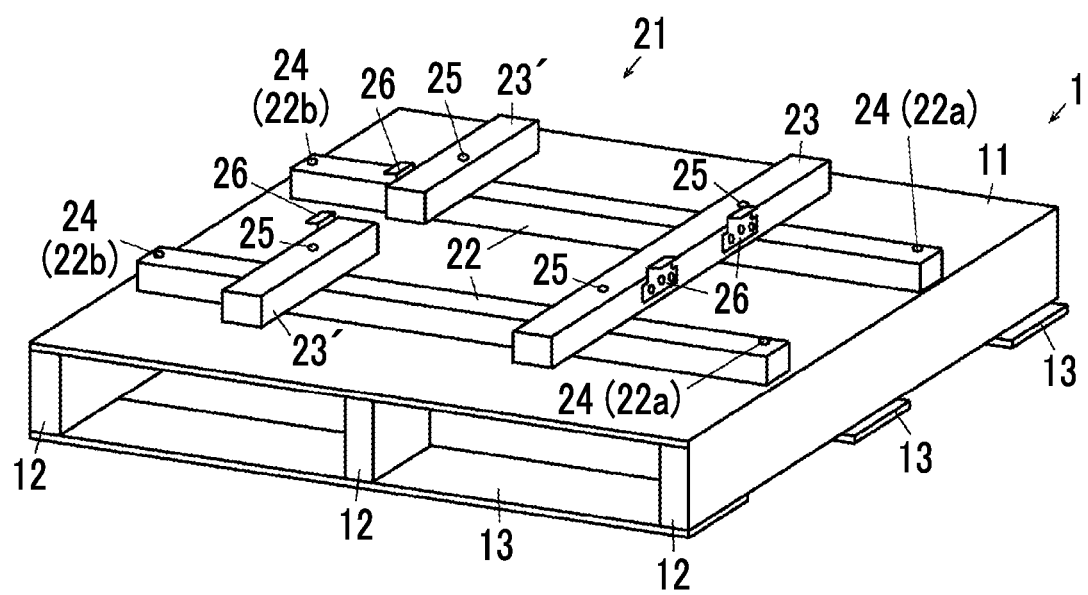
FIG. 5 is an explanatory view of a modification example of Example 1 and is a view corresponding to FIG. 3 of Example 1.

FIG. 5 is an explanatory view of a modification example of Example 1 and is a view corresponding to FIG. 3 of Example 1.

In FIG. 3, in Example 1, the shock absorbing material 21 including the lower rod materials 22 and the upper rod materials 23 disposed in parallel crosses has been described as an example. However, the present invention is not limited thereto. For example, as shown in FIG. 5, the upper rod materials 23 may be configured like upper rod materials 23' each of which is not continuous in the longitudinal direction and is divided into a plurality of parts and the brackets 26 may be supported on the upper rod materials 23'. In such a configuration as well, a shock can be absorbed by the upper rod materials 23' being bent in a state of being supported in a cantilevered manner with respect to the lower rod materials 22.

Modification Examples

Hereinabove, the example of the present invention has been described in detail. However, the present invention is not limited to the above example and various modifications can be made within the scope of the gist of the present invention described in the claims. Modification examples (H01) to (H08) of the present invention will be described below.

(H01) In the above-described example, the copying machine 2 has been used as an example of the fixation target. However, the present invention is not limited thereto. For example, the present invention can also be applied to any fixation target that can be loaded onto the pallet 1 like home appliances such as refrigerators and washing machines, electronic devices such as personal computers and servers, and musical instruments such as pianos and organs.

(H02) Specific numerical values mentioned in the above-described example can be appropriately changed in accordance with a change in design or specifications. Therefore, the number of the upper rod materials 23, the number of the lower rod materials 22, the number of the beams 12, the number of the bottom plates 13, and the number of the brackets 26 can be increased or decreased in any manner. For example, it is possible to replace two upper rod materials 23 with one wide member and a configuration with three ore members provided in accordance with the positions of anchors or the like can also be adopted.

(H03) In the above-described example, a configuration in which the lower rod materials 22 and the upper rod materials 23 are disposed in parallel crosses has been described as an example. However, the present invention is not limited thereto. For example, a shape in which the lower rod materials 22 and the upper rod materials 23 are disposed may be changed to any shape like a torii-like shape, a U-shape, a diamond-like shape, a polygonal shape such as a triangular shape or a pentagonal shape, and the like.

(H04) In the above-described example, the shock absorbing material 21 that uses the bending of the upper rod materials 23 has been described as an example. However, the present invention is not limited thereto. As described above, a shock can be absorbed by means of compression of a shock absorbing material. In this case, a configuration provided with only the upper rod materials 23 or only the lower rod materials 22 can be adopted.

(H05) In the above-described example, a configuration in which the casters 3 used to move a product are provided has been described as an example. However, the present invention is not limited thereto. A configuration in which so-called feet, which are immovable leg portions, can also be adopted. Note that in the case of a configuration in which the strength of a contact portion between the fixation target and the top plate 11 is sufficient and the contact portion is less likely to be damaged, a configuration in which each of the rod materials 22 and 23 is brought into contact with the contact portion (foot or like) can also be adopted.

(H06) In the case of the above-described example, a configuration in which fixation target parts such as the anchors 4 are provided is desirable, for example. However, a configuration in which no fixation target part is provided can also be adopted. For example, a fixation part that performs fixation by clamping a frame or being hooked on the frame can also be used.

(H07) In the above-described example, a case where the top plate 11, the beams 12, and the bottom plates 13 are composed of separate members has been described as an example. However, the present invention is not limited thereto. For example, the top plate 11, the beams 12, and the bottom plates 13 can also be integrally molded with each other by using resin or the like.

(H08) In the above-described example, the material of the pallet 1 is preferably wood or plastic (resin), for example. However, it is possible to use any material like paper such as cardboard and a foam material such as styrene foam in accordance with design.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A shock absorbing member which absorbs a shock acting between a top plate with an upper surface on which a fixation target is loaded and the fixation target, comprising:
   a fixation part that fixes the fixation target; and
   a shock absorbing part that is supported by the top plate, supports the fixation part, and absorbs a shock acting on the fixation part, wherein the fixation part is disposed on a side surface of the shock absorbing part, and the side surface of the shock absorbing part is perpendicular to the upper surface of the top plate.

2. The shock absorbing member according to claim 1, wherein the shock absorbing part having a rod-like shape extending in a longitudinal direction is provided.

3. The shock absorbing member according to claim 2, wherein the shock absorbing part disposed to be separated from a contact portion of the fixation target that comes into contact with the top plate is provided.

4. The shock absorbing member according to claim 3, wherein the shock absorbing part includes a first shock absorbing part supported by the upper surface of the top plate and a second shock absorbing part supported by an upper surface of the first shock absorbing part.

5. The shock absorbing member according to claim 2, wherein the shock absorbing part includes a first shock absorbing part supported by the upper surface of the top plate and a second shock absorbing part supported by an upper surface of the first shock absorbing part.

6. The shock absorbing member according to claim 2, wherein the shock absorbing part that extends in the longitudinal direction and is fixed to the top plate at a first fixation position and a second fixation position that is separated from the first fixation position in the longitudinal direction is provided.

7. The shock absorbing member according to claim 6, wherein the shock absorbing part disposed to be separated from a contact portion of the fixation target that comes into contact with the top plate is provided.

8. The shock absorbing member according to claim 6, wherein the shock absorbing part includes a first shock absorbing part supported by the upper surface of the top plate and a second shock absorbing part supported by an upper surface of the first shock absorbing part.

9. The shock absorbing member according to claim 1, wherein the shock absorbing part disposed to be separated from a contact portion of the fixation target that comes into contact with the top plate is provided.

10. The shock absorbing member according to claim 9, wherein the shock absorbing part includes a first shock absorbing part supported by the upper surface of the top plate and a second shock absorbing part supported by an upper surface of the first shock absorbing part.

11. The shock absorbing member according to claim 1, wherein the shock absorbing part includes a first shock absorbing part supported by the upper surface of the top plate and a second shock absorbing part supported by an upper surface of the first shock absorbing part.

12. The shock absorbing member according to claim 11, wherein the first shock absorbing part extending along a first longitudinal direction and the second shock absorbing part extending along a second longitudinal direction intersecting the first longitudinal direction are provided.

13. The shock absorbing member according to claim 12, wherein the fixation part provided on the second shock absorbing part is provided.

14. The shock absorbing member according to claim 13, wherein a gap is provided between the second shock absorbing part and the upper surface of the top plate.

15. The shock absorbing member according to claim 11, wherein the first shock absorbing part disposed across a plurality of connection parts is provided, the plurality of connection parts being supported on a lower surface of the top plate and disposed at intervals with respect to a plane direction of the top plate.

16. The shock absorbing member according to claim 1, wherein a gap is formed between a fixation target portion of the fixation target and the fixation part and the fixation target is movable relative to the fixation part.

17. A packaging material comprising:
a top plate with an upper surface on which a fixation target is loaded;
a plurality of connection parts that are supported on a lower surface of the top plate and disposed at intervals with respect to a plane direction of the top plate; and
the shock absorbing member according to claim 1 that is supported by the top plate and absorbs a shock acting on the fixation part.

18. A package comprising:
a fixation target;
a top plate with an upper surface on which the fixation target is loaded;
a plurality of connection parts that are supported on a lower surface of the top plate and disposed at intervals with respect to a plane direction of the top plate; and
the shock absorbing member according to claim 1 that is supported by the top plate and absorbs a shock acting on the fixation part.

* * * * *